United States Patent [19]
Dawirs

[11] Patent Number: 6,040,801
[45] Date of Patent: Mar. 21, 2000

[54] LOW DUTY CYCLE NAVIGATION SYSTEM

[75] Inventor: Willis R. Dawirs, San Diego, Calif.

[73] Assignee: The United States of America as represented by the Secretary of the Navy, Washington, D.C.

[21] Appl. No.: 04/364,892

[22] Filed: Apr. 30, 1964

[51] Int. Cl.[7] .................................................. G01S 3/02
[52] U.S. Cl. ........................... 342/457; 342/174; 342/385
[58] Field of Search ................................ 343/112.3, 106, 343/102; 342/174, 385, 457

[56] References Cited

U.S. PATENT DOCUMENTS 2,541,040  2/1951  Colin ........................................ 343/102
2,924,820  2/1960  Dishal et al. ............................. 343/102

*Primary Examiner*—Theodore M. Blum
*Attorney, Agent, or Firm*—Harvey Fendelman; Michael A. Kagan

[57] ABSTRACT

This invention relates to radio navigation systems and is particularly directed to means for transmitting range and azimuthal information to selected receivers only. More specifically this invention relates to a R-O navigating system in which the signal is so concealed in noise that the signal is of use only to friendly, as distinguished from enemy receivers. By this system enemy aircraft, in a military sense, cannot 'home' on either the shipboard or land-based beacons. Mobile equipment of the system of this invention is passive and is, hence, not subject to detection.

10 Claims, 6 Drawing Sheets

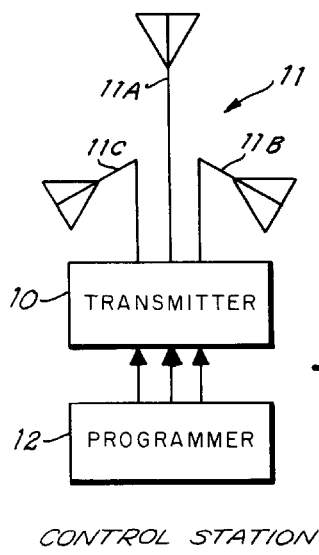
FIG. 1
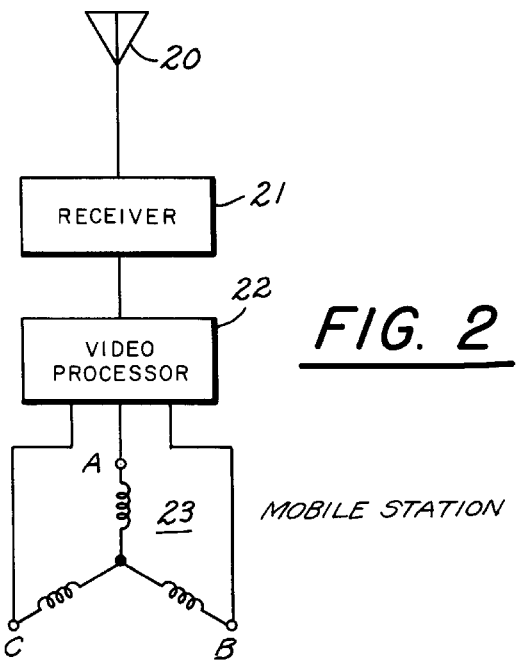
FIG. 2
FIG. 15
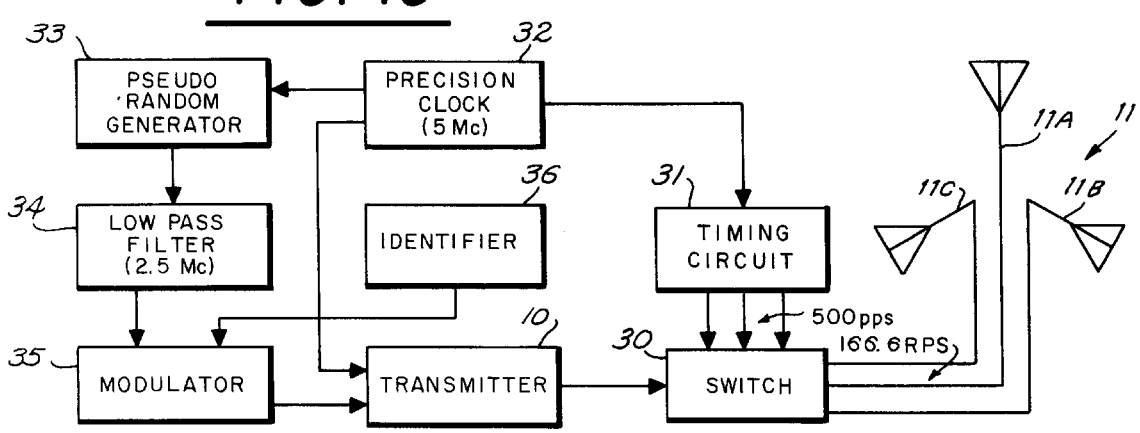
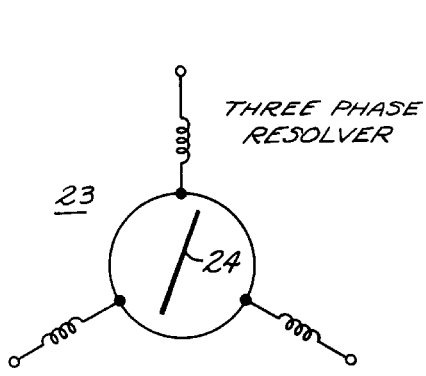
FIG. 5
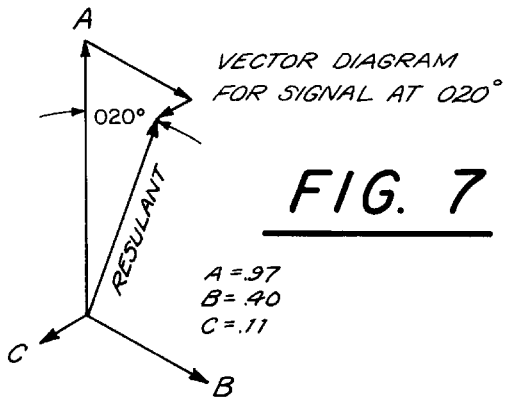
FIG. 7

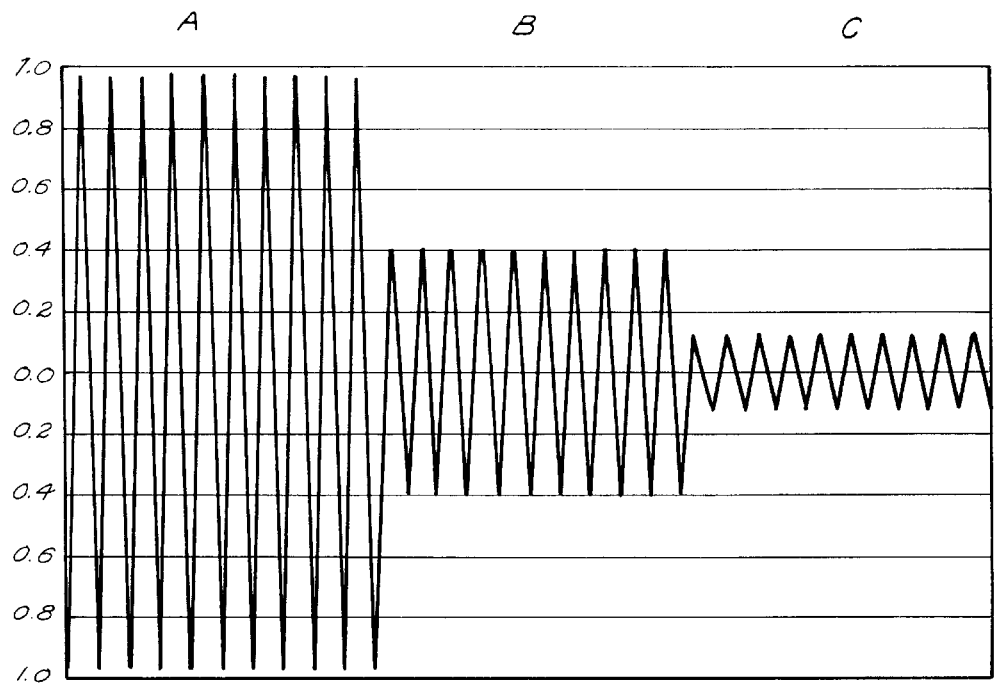
RELATIVE SIGNAL STRENGTHS AT 020°
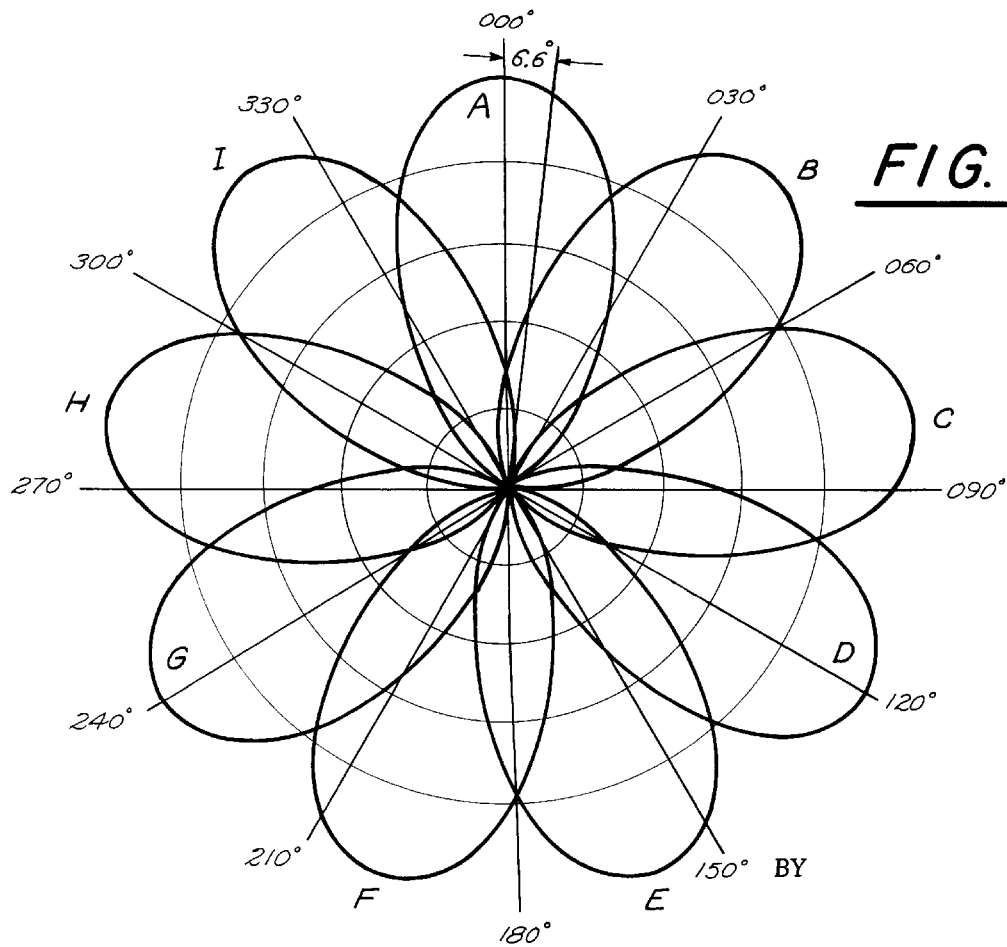

CROSS CORRELATION METHOD $\frac{SIN X}{X}$ FREQUENCY SPECTRUM

LOW DUTY CYCLE NAVIGATION SYSTEM

The invention described herein may be manufactured and used by or for the Government of the United States of America for governmental purposes without the payment of any royalties thereon or therefor.

This invention relates to radio navigating systems and is particularly directed to means for transmitting range and azimuthal information to selected receivers only. More specifically this invention relates to a R-θ navigating system in which the signal is so concealed in noise that the signal is of use only to friendly, as distinguished from enemy receivers. By this system enemy aircraft, in a military sense, cannot 'home' on either the shipboard or land-based beacons. Mobile equipment of the system of this invention is passive and is, hence, not subject to detection.

The beacon of the TACAN or VORTAC type system, in general, rotates a high-duty-cycle antenna pattern and transmits a reference signal each time the pattern passes through some reference angular position, such as north. The mobile station then determines bearing with respect to the reference station by measuring the time required for the antenna pattern to rotate from the reference position to the angle at which the mobile station is located. The radio frequency signal is made up of approximately 2700 pulses per second to form the antenna pattern envelope. In such systems, range is determined at the mobile station by interrogating the beacon and measuring the propagation round trip time from the mobile station to the beacon station. Unfortunately the duty cycle of the Tacan type system is high and the radio frequency energy is subject to detection by enemy aircraft.

The object of this invention is to make secure the signal of the R-θ type navigating systems.

The object of this invention is attained first by maintaining the mobile stations completely passive; that is, they transmit no radio signals. According to this invention precision synchronized clocks are maintained at both the beacon and at the mobile stations. Then, when a signal is received by the mobile station from the beacon, the time or phase relation of the received signal is compared with the locally generated reference signal to determine the one-way transmit time from the beacon to the mobile station. This phase or time may then be calibrated in terms of miles of range. Next, the transmission from the beacon is made economically unusable to the unfriendly receiver by modulating the transmitted signal with pseudo-random signals and so increasing the bandwidth of the communication channel that the signal appears as noise to the narrow-band receiver. Finally, to give the mobile station azimuthal information wideband radio frequency signals at the beacon are transmitted in several discrete patterns fixed at specific angular orientations. For example, an array may comprise three separate antennas each capable of producing a cardioid pattern and angularly spaced 120° apart. Means are provided for identifying the radio frequency energy radiated by each of the several antennas. Simultaneous transmission on different frequencies, or on a time shared basis at one frequency, is contemplated.

Other objects and features of this invention will become apparent to those skilled in the art by referring to the specific embodiments described in the following specification and shown in the accompanying drawings in which:

FIG. 1 is a simplified block diagram of one beacon embodied in the navigating system of this invention;

FIG. 2 is a simplified block diagram of a mobile receiver adapted to cooperate with the beacon of FIG. 1;

FIG. 5 is a circuit schematic diagram of one type of resolver which can be employed with the receiver of FIG. 2;

FIG. 6 is a waveform diagram of the three carrier signals radiated at one specific angle from the antennas of FIG. 1;

FIG. 7 is a diagram of the signal vectors of one azimuthal direction;

FIG. 8 is the field pattern of a 9-lobe antenna;

FIG. 15 is a block diagram of one specific beacon station embodied in the system of this invention.

Figure 3:
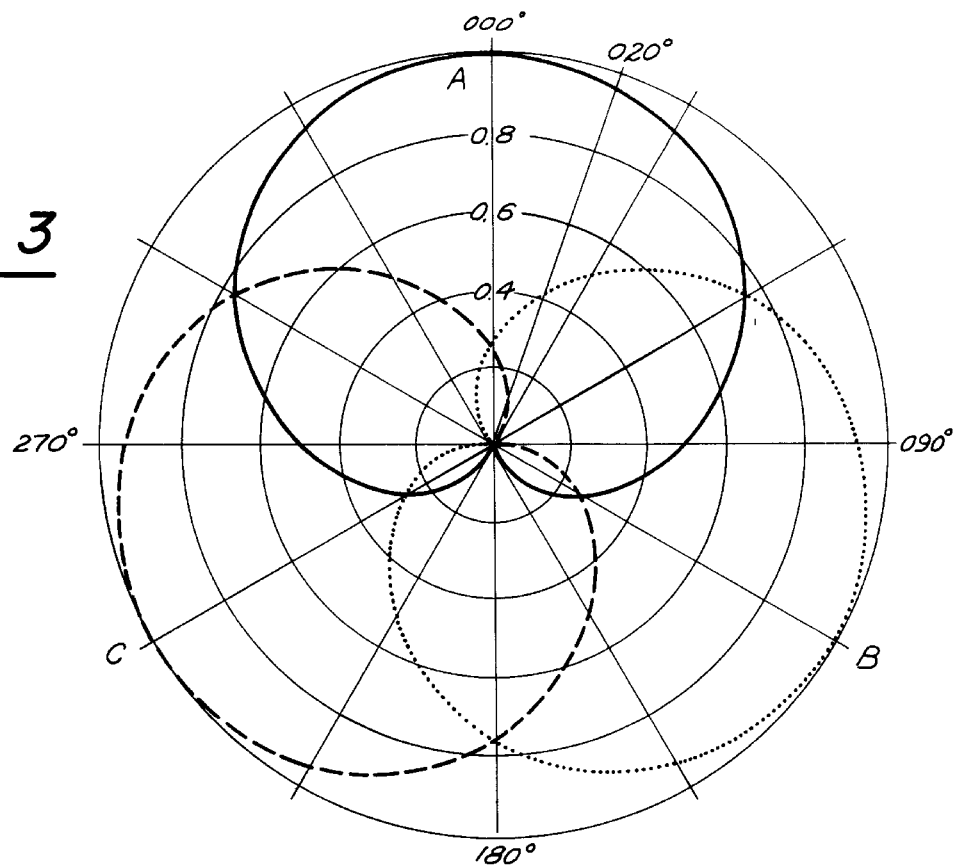
FIG. 3 is a radiation pattern of the directional antennas of the beacon of FIG. 1.

In the beacon station of FIG. 1 the transmitter 10 feeds radio frequency energy to the antenna system 11. In the preferred embodiment, energy is fed successively to antennas 11A, 11B and 11C under the control of the programmer 12. According to an important feature of this invention antennas 11A, 11B and 11C are each directional and each preferably has a cardioid radiation pattern. Cardioid patterns may be formed, for example, by a loop and a vertical antenna, fed in phase. Where there are three directional antennas they are oriented to face in directions 120° apart. Hence, with three antennas the three cardioids will appear as in FIG. 3.

The signals radiated by the antenna 11 system are received by the omnidirectional antenna 20 of the mobile station of FIG. 2. The received signal is demodulated in the receiver 21 and is processed in the video processor 22 to derive the three signals individual to the three antennas 11A, 11B and 11C of the beacon. The three signals are applied at terminals A, B, and C, respectively of the resolver 23. The resolver shown in greater detail in FIG. 5 may comprise three coils or windings, the axes of which are disposed 120° about the magnetic armature 24. The armature is free to rotate in the magnetic field produced by the three windings and, hence, to resolve vectorially the direction of the resultant field.

Figure 4:
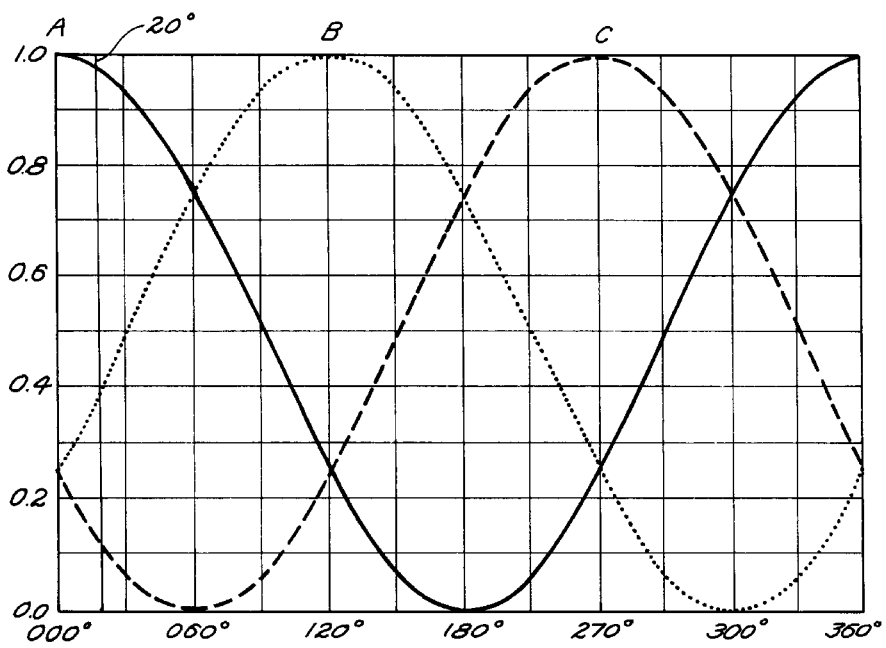
FIG. 4 is a rectilinear graph of the signals radiated from the antenna of FIG. 1 plotted against degrees of the compass.

In FIG. 4 the relative radiated signal strengths of the three antennas 11A, 11B and 11C are plotted against the 360 degrees of the compass. For convenience, north will be assumed to be the reference or zero angle direction.

Let it be assumed that the mobile station of FIG. 2 is on the 20° radial, FIG. 3. The relative strength of the three radio frequency signals received may be observed by measuring outwardly from the origin to the intersection of that radial and the three cardioidal lines. Alternatively, the relative signal strengths, may be observed on the vertical 20° line of FIG. 4. These three signals are applied to the three coils of the resolver, the resultant vectorial addition of signals A, B and C being depicted in FIG. 7. At 20° the relative signal strength of the three signals will be 0.97, 0.40, and 0.11. It is significant that the relative amplitudes of the radio frequency signals on the 20° radial, shown in FIG. 6, are maintained whether the radio frequencies are the same or are different at the several antennas.

Figure 9:
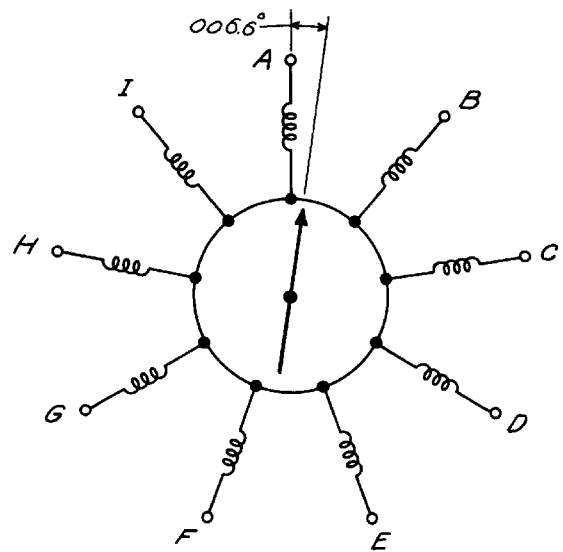
FIG. 9 shows the windings of a resolver for the signal of FIG. 8.

According to an important feature of this invention, the sum of the voltages of the several cardioidal patterns is constant among the radials on any one circumference of a circle coaxial with the transmitting antennas. Although three antennas have been discussed above it will appear that any number of antennas with corresponding communication channels may be employed. In FIG. 8 it is suggested that nine antenna and nine signal patterns be employed in the interest of greater azimuthal accuracy. In FIG. 9 the nine signals are received, detected and applied to the nine coils, A to I, respectively, of the resolver.

Figure 10:
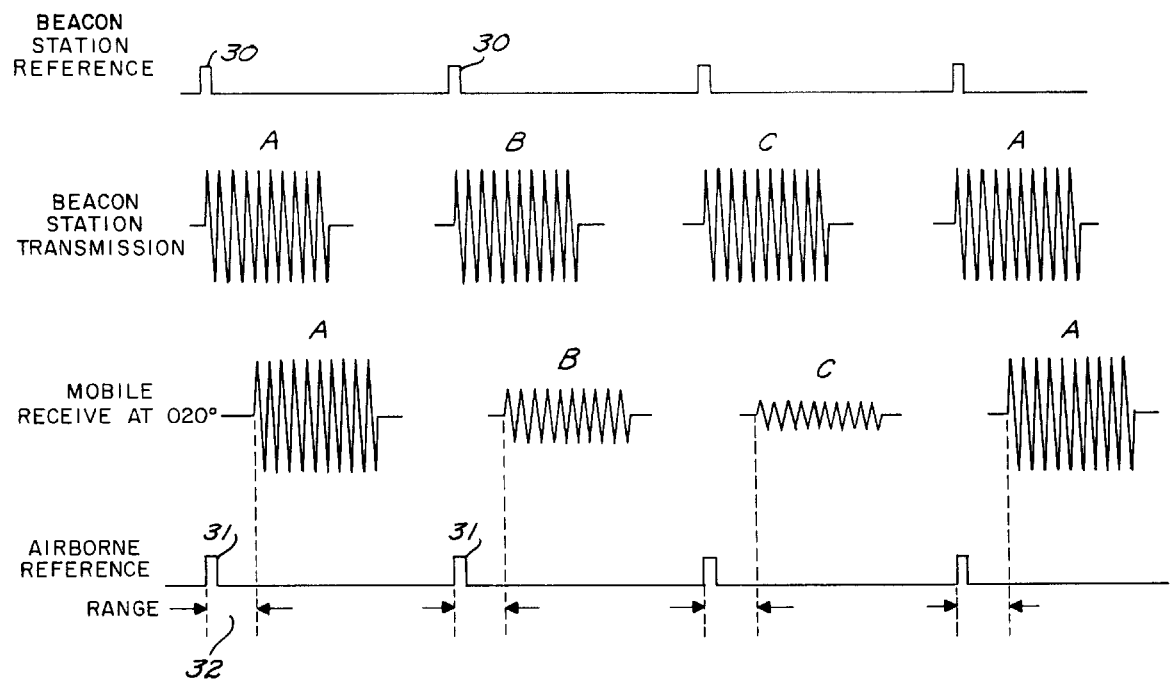
FIG. 10 is a diagram of evenly spaced pulses and a signal waveform of the system of FIGS. 1 and 2.

To obviate the necessity of transmission from the mobile station to the beacon, precisely synchronized clocks, according to another feature of this invention, are installed at both the beacon and in each of the mobile stations. By accuracy is meant a long term stability of at least one part in $10^{10}$. Such accuracies for R-θ measurements are acceptable particularly if all clocks are synchronized within a few hours of use, as dictated by the military mission involved. If the beacon station clock produces reference pulse 30, FIG. 10, the mobile clock produces simultaneously pulses 31. Each of the pulse signals A, B and C adjusted in amplitude according to the radiation patterns, will arrive at the airborne station at increments of time 32 after the beacon pulses. This increment of time is directly proportional to the one-way range traveled by the radio wave. Alternatively, the pulse 31 can be phase shifted in time to occur at the instant of arrival of the pulse 30. It will appear that,if desired, the timing interval may start without the actual generation of the distinct pulse 31. It is preferred that each of the signals A, B and C of all radiation patterns be received, added and compared with the airborne clock reference so that the amplitude of the range signal may be independent of azimuth. It will be apparent now that no receiver can intercept the signals of the beacon of this invention without equipment for separating the plural channel or time-shared signals and a resolver for displaying the range and azimuth information as well as knowledge of the order in which the channels may be employed. This order may be changed momentarily or by prearrangement.

Figure 11:
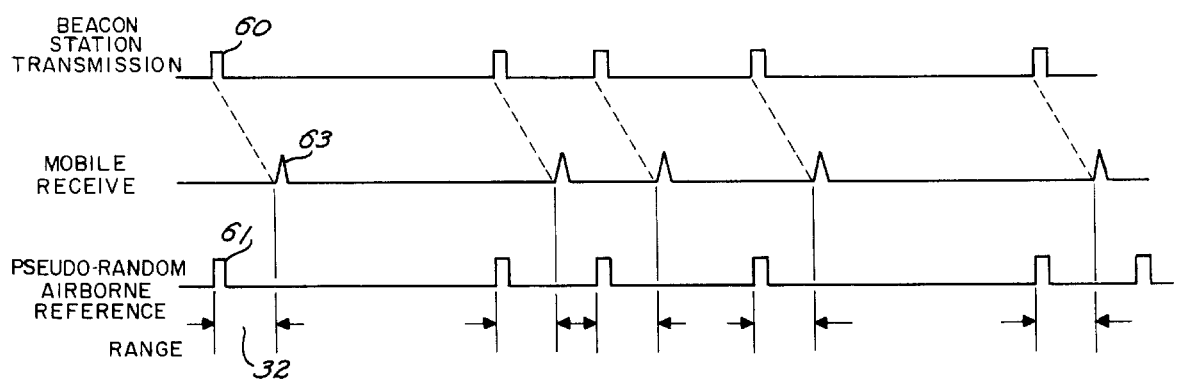
FIG. 11 is a diagram of random pulses of the system of FIGS. 1 and 2.

Preferably, the pulses are randomly spaced as shown in FIG. 11. As will appear below, pseudo random pulses 60 at the beacon and 61 at the mobile stations can be synchronized, and the range shift 32 measured.

The system of this invention is adapted to signals of the type which can approach electronic security. The system is adapted to transmit bits of information so minute in energy content that the bits can be hidden in the noise of the system. The system of this invention employs two methods for obtaining signal advantage. First the signal is spread in the time domain and second, the signal is spread in the frequency domain. The numerical criterion of the signal advantage obtained is TΔf, which is the product of the integration time T of the detection process, and the frequency bandwidth, Δf, over which the signal has been spread. Pseudo-random signal bits and cross-correlation techniques are useful, according to this invention, in developing a large TΔf and to make the transmitted signal appear like random noise.

Figure 13:
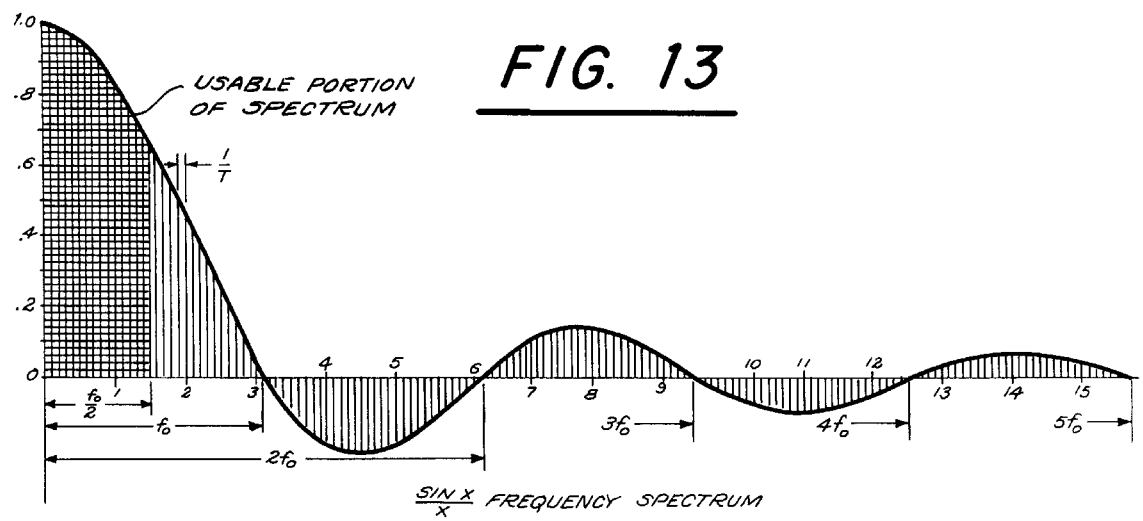
FIG. 13 shows the frequency spectrum of the pseudo-random generator of this invention.

A signal can be spread in the time domain by transmitting it in increments of energy so small that an intercepting receiver not in possession of the key to the sequence of the increments will experience difficulty in reconstructing the original signal. Where the signal-to-noise ratio is low, any receiver must collect the increments of information over a sufficient period of time to accumulate sufficient signal strength to build up a useful output. Recovery of the time-spread signal of this invention involves a correlation process which includes three distinct operations including time delay, multiplication, and long-time averaging or integration. According to this invention, a pseudo-random sequence of binary bits are produced at both the beacon and at the mobile station. One practical means for producing such a pseudo-random sequence is a digital shift register with feedback loops connecting various stages of the register, the register being driven at a relatively high clock frequency. Timing of the sequence at both stations is provided by the precision clock employed in the range measurements. The resulting signal when analyzed has the typical sin x/x frequency spectrum shown in FIG. 13. In FIG. 13 the first frequency component, $f_o$, of zero amplitude in the spectrum is determined by the frequency of the timing oscillator. Then, $f_o=1/t_o$ and the spectral lines are spaced 1/T where T is the period of the complete random sequence, $f_o$ is the clock frequency, and $t_o$ is the clock period. The energy of the signal may be spread over a wide time interval and over a wide frequency band by using a high frequency clock. Now, the signal itself can be made to appear as band-limited white noise by passing it through a low pass filter which suppresses all frequencies above about $f_o/2$. This, then, obscures the sin x/x pattern which would otherwise be easily recognized by a hostile interceptor.

Figure 12:
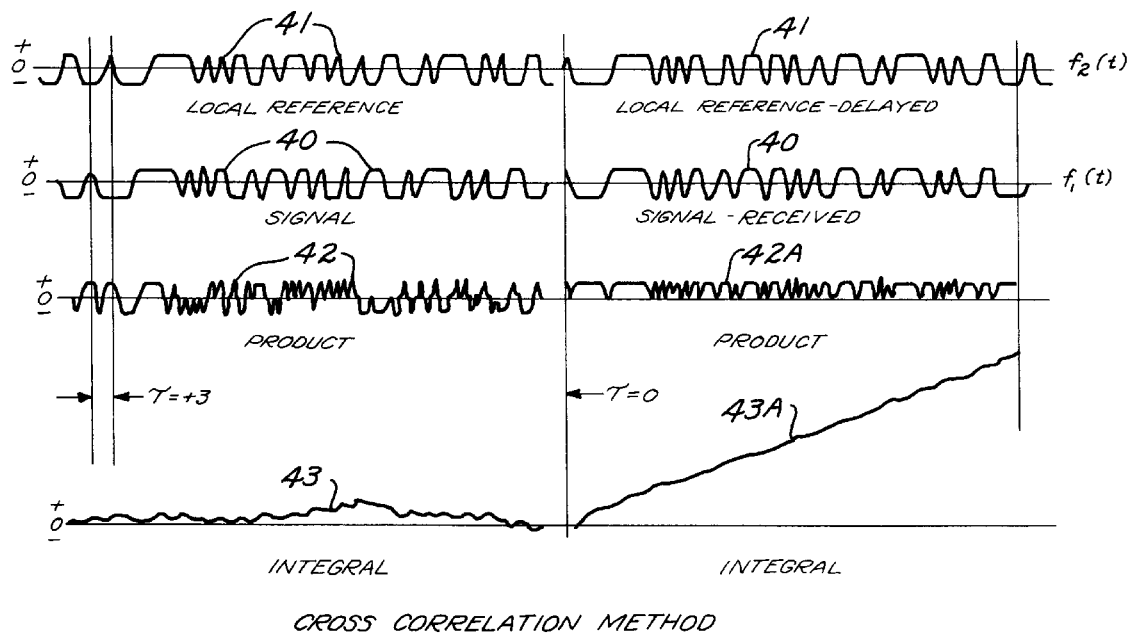
FIG. 12 shows the cross-correlation of typical received and locally generated signals at the receiver of FIG. 14.

The sequence of pseudo-random bits transmitted via the radio link from the beacon to the mobile station is compared to a locally generated sequence. The cross-correlation function of such a comparison is a maximum when the two sequences have identical phase relations. Significantly, the time delay required of the locally generated wave to obtain this maximum cross-correlation at the mobile station is equal to the time of propagation of the signal from the transmitter to the receiver. Therein lies the desired range information. In FIG. 12, if the received signal 40 is not in phase with the local reference 41 both positive and negative voltages appear in the product detection output, 42, and the integral 43 remains at or near zero. If, however, the signals 40 and 41 are in phase, by proper delay of the local reference, the product 42A is of one polarity and the amplitude of the integral 43A depends only on the period length of integration. In this system the locally generated wave is a noise free signal which results in less noise at the correlator output than in the case of auto-correlation. Further, the resulting signal advantage of the cross-correlation receiver increases as the signal-to-noise ratio of the received signal decreases. Therefore, the signal-to-noise ratio at the correlator output can be increased by increasing the integration time. That is, T is increased in the expression TΔf where T is the integration time of the input signal and Δf is the frequency bandwidth.

In considering signal spreading in the frequency domain it is to be remembered that in order to make the most efficient use of the available radio spectrum it has been customary to keep the communication channels as narrow as possible, and to provide a high density of signal energy per unit of bandwidth. According to this invention the information signals are hidden by spreading the signals over a wide band of frequencies to keep the energy density per unit of bandwidth below the threshold level of the conventional narrowband receivers. For example, a few one-megacycle channels, such as those presently standardized in Tacan, is ample for completely concealing, for military purposes, the signals of this invention. It is possible to spread the signal energy in the frequency domain by dividing the signal among the several spaced frequency channels. That is, the frequency spread can be combined with time domain signal spreading and by time-frequency hopping, thereby obtaining a very large TΔf advantage. The digital shift register type pseudo-random sequence generator of this invention provides convenient control for both the time and frequency spreading techniques. The generator produces a wide-band noise-like signal which is difficult to distinguish from actual noise. The sequence contemplated is a series of binary signals of constant width and peak amplitude which has, at all times, either of two possible values, namely ones or zeros, which although apparently random are actually fixed and predictable and reproducable. The sequence is easily changed in a shift register by changing the stages between which feedback connections are made and the sequence will be the same in all registers when reset to zero and started simultaneously. One type of shift register pseudo-random operator is treated in Memorandum No. 20-149, entitled "Non-Linear Shift-Register Sequences", published Oct. 25, 1957 by the Jet Propulsion Laboratory of California Institute of Technology, Pasadena, Calif.

The number of stages of the shift register pseudo-random generator may be of any desired number. A 40 stage shift register has been chosen as a reasonable compromise between sequence period and circuit complexity. When driven at a clock frequency of 5 megacycles, the longest resulting sequence will be more than 48 hours. This is sufficiently long with respect to the nominal 4 hours required for the usual tactical mission to prevent deciphering. A four-hour sequence would require 36 stages. Conveniently, wave length or pulse interval of the clock generator may be made and adjusted in terms of integral numbers of miles for easy range calibration.

The principal elements of one beacon station, embodying this invention, are shown in FIG. 15.

Figure 14:
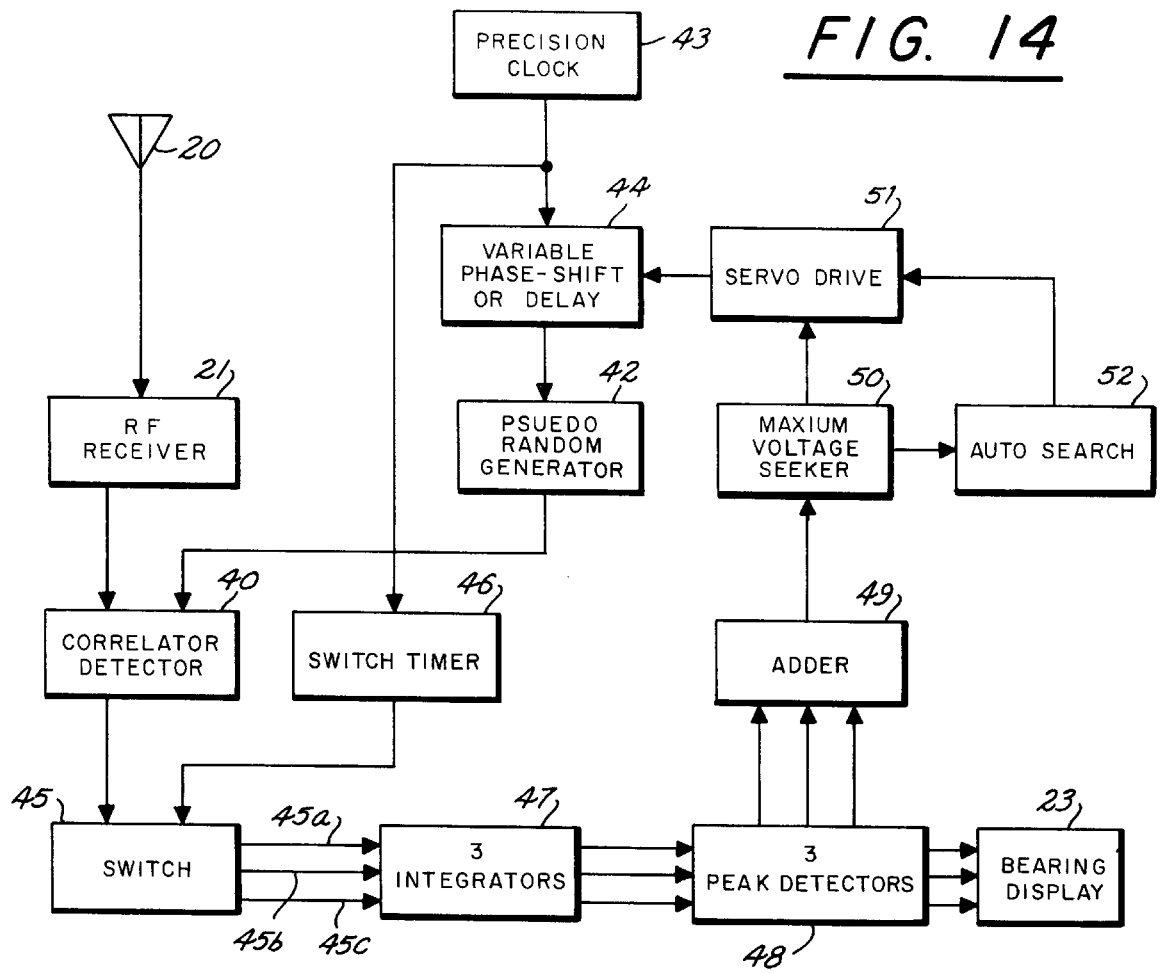
FIG. 14 is a block diagram of one receiver of the mobile station of the system of this invention.

The mobile station is shown in FIG. 14. The radio transmitter 10, FIG. 15 feeds through the switch mechanism 30 to successively apply bursts or single pulses of high frequency energy to the directional antenna system 11. FIG. 12 illustrates a burst, while FIG. 11 illustrates single pulse modulations. Three antennas, 11a, 11b and 11c are shown in this example. The switch mechanism 30 is under the control of the timing circuits 31 which is driven by the precision clock generator 32. The clock frequency of 5 megacycles in this example, is divided down to rotate the antenna pattern a few hundred revolutions per second. Consistent with the objects of security, the duty cycle of radiated signals is kept low. The pseudo-random generator 33 may comprise as stated, a shift register of, say, forty stages for generating a series of binary "ones" and "zeros" in random order, being provided at the receiving station. For concealing the sin x/x spectrum, the signals of the random generator are passed through the low-pass filter 34 and applied to the modulator 35 where the random code is applied to the transmitter 10. The cut-off of the filters 34 is selected at some frequency sufficiently below $f_o$, FIG. 13, as to prevent reconstruction of the sin x/x spectrum. The frequency of $f_o/2$ is suggested. Coded signals generated by the identifier 36 may also be applied to the modulator to permit identification of the beacon station at all mobile receivers.

The signals of the beacon are received at the omni-directional antenna 20 of the mobile receiver of FIG. 14. The radio frequency receiver amplifies the composite signal and detects, in detector 40, the coded modulations of the signal. The detected coded signal must be matched by or correlated with the locally generated coded signal to pass the detector 40. The locally generated coded signal is generated in the code generator 42. The locally generated code is, as stated, identical to the beacon code. According to an important feature of this invention, the locally generated code is delayed by an amount corresponding to the one-way travel time of the signal from the beacon. The repetition rate of the code group is controlled by the local precision clock generator 43, and conveniently, the output of the clock is delayed the desired amount by the variable delay or phase shifter 44. For a given range there is an optimum delay of the delay device 44 to yield a maximum signal in the output of the correlator-detector. The correlator output is applied to the commutator switch mechanism 45. Switch 45 is under the control of the switch timer 46 which is, in turn, synchronized by the precision clock 43. By synchronous commutation techniques the A, B, and C signals are distributed to the output lines 45a, 45b and 45c. The three isolated signals are preferably then integrated in separate integrators 47 and fed, in turn, to three peak detectors 48. The outputs of the detectors are then applied to the three windings of the resolver 23 where the bearing from the beacon is displayed. Characteristically the received and locally generated code are of the type shown, respectively, at 40 and 41 in FIG. 12, the output of the correlator-detector is shown at 42A, and the outputs of the integrators are shown at 43A.

The range adjustments of the receiver may be made to track the beacon range as the relative distance between the beacon and receiver changes. For this purpose the adder 49 continuously arithmetically sums the A, B and C signals and when these signals change because of phase shift with airplane motion, the output voltage of the adder is sensed in the maximum voltage seeker 50. The servo-drive 51 responds to the changing voltage caused by doppler shift to drive, in the proper direction, the variable delay 44 to keep the output of adder 49 at its peak. If tracking control is lost, search must be started and continued by auto-search device 52, until lock-on.

Many modifications may be made in the system of this invention without departing from the scope of the invention as defined in the appended claims.

What is claimed is:

1. In a radio transmitter-receiver combination of a R-θ type navigating system having a predetermined signal-to-noise threshold below which signals cannot be transmitted, received, modulated, and displayed, the method comprising:

generating a carrier wave at the transmitter;

generating like groups of coded binary pulses at the transmitter and at the receiver;

modulating said carrier with said coded binary pulses, said pulses being of such small increments of energy and so widely distributed in time that the signal-to-noise ratio at the receiver is below said threshold;

combining at the receiver the received and the locally generated groups of pulses;

shifting at the receiver the relative time phase of the two groups of pulses so that the two groups cross-correlate, multiplying one group voltage by the other, and integrating the product until the stored signal exceeds said threshold; and finally calibrating said relative phase shift in terms of distance between the transmitter and receiver.

2. The method defined in claim 1 further comprising extending the duration of the code group sequence of ones and zeros beyond said integration time to prevent deciphering of the group.

3. The method defined in claim 1 further comprising generating ones and zeros in a non-repetitive sequence longer than said integration time.

4. A navigating system comprising a beacon transmitter and a mobile receiver:

like clock generators at said transmitter and at said receiver;

like pseudo-random generators at the transmitter and receiver for generating a continuous spectrum of frequencies containing components of non-repetitive sequence of binary digits at the frequencies;

a low-pass filter at the output of the generator at the transmitter for attenuating frequencies above approximately one-half the clock frequency so that the output of said pseudo-random generator resembles band-limited white noise without coherent information;

a cross-correlation detector at said receiver with inputs coupled, respectively, to the local pseudo-random generator and to the received signal sequence, and means for integrating the output of said detector.

5. A beacon in the radio system of the class described, comprising:

a stabilized fixed frequency clock generator of the frequency $f_o$;

a pseudo-random signal generator driven by said clock generator for generating a predetermined non-repetitive sequence of binary ones and zeros at said frequency of $f_o$ to generate a frequency spectrum of the general form sin x/x with the lowest frequency component of zero amplitude being said $f_o$;

a low-pass filter coupled to the output of said generator for attenuating all frequencies in said spectrum above a predetermined frequency below said $f_o$ so that the passed frequencies appear to a receiver with a pass band less than said $f_o$ as a band-limited white noise, and a radio frequency transmitter coupled to said filter for radiating a carrier modulated by the output of said filter.

6. The beacon defined in claim 5 further comprising:

a plurality of differently directed directional antennas, and switch means coupled between said radio frequency transmitter and said antennas, for successively energizing said antennas.

7. The beacon defined in claim 5 further comprising:

a plurality of differently directed directional antenna, switch means responsive to said clock generator for successively coupling said radio frequency transmitter to said antennas.

8. A mobile station of the class described comprising:

a radio receiver;

a stabilized fixed frequency clock generator of the frequency $f_o$;

a pseudo-random signal generator driven by said clock generator for generating a predetermined non-repetitive sequence of binary ones and zeros at said frequency of $f_o$;

a correlation detector coupled to said radio receiver and said signal generator for multiplying together the signals of said receiver and pseudo-random generator;

a plurality of integrator circuits;

a switch means responsive to said clock generator for successively connecting the output of said correlation detector to said integrator circuits, and resolver means coupled to said integrators for bearing display.

9. The mobile station defined in claim 8 further comprising:

a variable delay means for shifting the relative phase of the receiver and pseudo-random generator inputs to said correlation detector to obtain maximum detector output.

10. The mobile station defined in claim 8 further comprising:

a variable delay means for shifting the relative phase of the receiver and pseudo-random generator inputs to said correlation detector to obtain maximum detector output, and means responsive to the sum of the amplitudes of the outputs of said integrator circuits for adjusting said variable delay means for tracking in range the received signals.

* * * * *